United States Patent [19]

Borlinghaus

[11] Patent Number: 5,282,672
[45] Date of Patent: Feb. 1, 1994

[54] VEHICULAR SEAT WITH OCCUPANT RESTRAINT SYSTEM

[75] Inventor: Hans J. Borlinghaus, Mt. Clemens, Mich.

[73] Assignee: General Motors Corporation, Detroit, Mich.

[21] Appl. No.: 915,585

[22] Filed: Jul. 20, 1992

[51] Int. Cl.$^5$ .............................................. A62B 35/00
[52] U.S. Cl. .................................... 297/468; 280/806; 297/473
[58] Field of Search .................. 297/468, 470, 473; 280/801, 806

[56] References Cited

U.S. PATENT DOCUMENTS

| | | | |
|---|---|---|---|
| 2,680,476 | 6/1954 | Saffell | 155/189 |
| 3,484,134 | 12/1969 | Townsend | 297/386 |
| 3,957,304 | 5/1976 | Koutsky et al. | 297/468 |
| 4,790,597 | 12/1988 | Bauer et al. | 297/468 |
| 4,993,747 | 2/1991 | Borlinghaus et al. | 280/806 |
| 5,037,132 | 8/1991 | Borlinghaus et al. | 280/801 |

*Primary Examiner*—Lloyd A. Gall
*Attorney, Agent, or Firm*—Charles E. Leahy

[57] ABSTRACT

An adjustable vehicular seat assembly includes a fixed rail attached to the vehicle underbody and a sliding rail movably carried on the fixed rail. A six-way power seat adjustment mechanism is supported on the sliding rail and connects a seat frame thereto. A buckle for a seat belt harness is pivotally attached to the rearward end of the sliding rail and extends upwardly to a pivotal connection on the seat frame. The buckle includes a piston and hydraulic cylinder arrangement extendable and collapsible between the respective pivotal connections on the seat frame and the sliding rail for adjusting the distance between the two pivotal connections while the seat frame is articulated vertically by the power seat adjustment mechanism. The piston is carried on a piston rod integral with the buckle and includes a plurality of axially extending flow control orifices for restrictively conducting fluid flow while reciprocating within the hydraulic cylinder.

2 Claims, 3 Drawing Sheets

VEHICULAR SEAT WITH OCCUPANT RESTRAINT SYSTEM

TECHNICAL FIELD

The subject invention relates to a buckle for a seat belt harness mounted to and moveable with the sliding track of a vehicular seat adjustment mechanism, and more particularly provides a hydraulic cylinder for adjusting the distance between the buckle and the sliding rail during articulated movement of the vehicle seat.

BACKGROUND ART

Vehicular occupant restraint systems usually include a seat belt harness comprised of a lap belt and a shoulder belt which merge at a clasp structured to releasably engage a manual buckle mechanism. The buckle is typically attached by a flexible strap to the vehicle underbody to function as an anchor when the occupant restraint system is placed into use.

The buckle is normally positioned at or near the seat cushion on the inboard side of the seat for easy accessibility when joining or disjoining the seat belt harness and buckle assembly. Because the buckle is anchored to the underbody, a problem arises when the seat is adjusted between forward and rearward and/or raised and lowered positions to orient the driver or passenger in a comfortable position.

If the occupant is particularly small in stature, the seat will be articulated forwardly and upwardly to the maximum extent of the seat adjustment mechanism. This relative movement of the seat causes the underbody anchored buckle of the occupant restraint system to become positioned below and behind the seat cushion. Thus, a small statured occupant often has to search and grope for the buckle when joining and disjoining the seat belt harness. Searching for the buckle behind or below the seat cushion is particularly aggravated when in an unfamiliar vehicle, when low lighting conditions or disagreeable weather conditions exist. Also, with the buckle positioned below and behind the seat cushion of a forwardly adjusted seat, the seat belt harness may wrap around the edge of the seat cushion causing an uncomfortable condition.

Alternatively, if the occupant is large in stature, the seat assembly will be articulated completely rearwardly and in a lowered condition such that the buckle anchored to the underbody will become positioned significantly above and forwardly of the seat cushion. Thus, when the buckle is connected to the seat belt harness, the buckle may lay uncomfortably across the large occupant's leg or in some other way cause discomfort due to its position above the seat cushion.

The prior art has sought to overcome this problem by anchoring the buckle to a stationary fixed rail of the seat adjustment mechanism and attaching an upper portion of the buckle to the moveable seat frame. A hydraulic cylinder is provided between the seat frame and the fixed rail to account for relative movement between the fixed rail and seat frame.

For example, U.S. Pat. Nos. 4,993,747 and 4,037,132, both issued to Borlinghaus et al, on Feb. 19, 1991 and Aug. 6, 1991, respectively, and both assigned to the assignee of the subject invention, disclose buckle mechanisms including hydraulic cylinders. These vehicular seat assemblies include a fixed rail for attachment to a vehicle underbody or floor, a sliding rail movably carried on the fixed rail, a seat frame operatively supported above the sliding rail for receiving and supporting a vehicle seat cushion, an articulator means or some form of power seat adjustment mechanism interconnecting the seat frame and the sliding rail for moving the seat frame upwardly and angularly relative to the sliding rail, and a buckle means for releasibly clasping a seat belt harness relative to the fixed rail.

Although quite effective, the primary disadvantage of the assemblies disclosed in these Borlinghaus et al patents is that the hydraulic cylinder is exceptionally long and must be structured with an over-travel mechanism because of the large movement variability between the seat frame and the fixed rail. The Borlinghaus et al '747 reference teaches electrifying the hydraulic fluid to achieve a desired viscosity within the hydraulic cylinder. Over-travel mechanisms are required because the typical horizontal travel between the sliding rail and the fixed rail is approximately 8 inches, and the typical vertical travel provided by the articulator means is approximately 2 inches. Therefore, because the hydraulic cylinder is attached to the rearwardmost end of the fixed rail, the hydraulic cylinder must extend/contract a minimum of 8 inches travel in the horizontal direction and approximately 2 inches in the vertical direction, which results in a minimum diagonal vector travel of almost 9 inches.

Thus, the hydraulic cylinders disclosed in the Borlinghaus et al patents are expensive to manufacture because of their large size to accommodate travel limits and their relatively complex over-travel mechanisms provided. Further, the hydraulic cylinders in the Borlinghaus et al references are adapted primarily for two door model vehicles where the rear seat is not frequently used. The long hydraulic cylinders employed in such vehicles tend to crowd the feet of the rear seat occupants when the forward seat is moved to a forwardmost location and are susceptible to abrasion or damage from the feet of rear seat occupants and/or cargo. Hence, new constructions are needed to accommodate seat articulation and for enhancing the comfort of rear seated occupants.

SUMMARY OF THE INVENTION AND ADVANTAGES

The subject invention contemplates an adjustable vehicular seat assembly having integral occupant restraint components. The assembly comprises a fixed rail for attachment to a vehicular underbody, a sliding rail movably carried on the fixed rail, a seat frame operatively supported above the sliding rail for receiving and supporting a vehicular seat cushion, an articulator means interconnecting the seat frame and the sliding rail for moving the seat frame upwardly and angularly relative to the sliding rail, and a buckle means for releasibly clasping a seat belt harness. The improvement comprises an adjustor means supported on and moveable with the sliding rail for operatively connecting the buckle means to the sliding rail and for adjusting the distance between the buckle means and the sliding rail during articulated movement of the seat frame to continuously maintain the buckle means at a predetermined position relative to the seat frame, thereby increasing occupant comfort and convenience.

The adjustor means of the subject invention overcomes the disadvantages of the prior art by supporting the buckle means upon the sliding rail and also by adjusting the distance between the buckle means and the sliding rail during articulated movement of the seat frame so that the buckle means is always maintained at a predetermined optimum position relative to the seat frame and the seat cushion to increase convenience in connecting the seat belt harness to the buckle means and increasing the occupant's comfort while harnessed in the seat. That is, the adjustor means continuously positions the buckle means in the same position relative to the seat frame, regardless of the adjusted position of the seat, so that the occupant is never required to grope and search for the buckle means. Therefore, the buckle means is always in an optimum position conveniently accessible to the occupant whose seat is adjusted fully forward as well as to the occupant whose seat is adjusted fully rearward.

Because the adjustor means is supported on and moveable with the sliding rail, it can be very compact as it is not required to adjust for horizontal movements of the sliding rail. In other words, because the seat frame and sliding rail move together in the horizontal direction, the adjustor means is not required to compensate for horizontal relative movement between the two. Instead, the adjustor means need only compensate for lateral relative movements between the seat frame and the sliding rail, which, in practice, do not exceed three inches.

Thus, the adjustor means of the subject invention is able to maintain the position of the buckle means at a conveniently predetermined location relative to the seat frame so that the buckle means is consistently oriented in an easily accessible location for the occupant of any stature, as well as simple in construction, inexpensive to manufacture, and easily retrofit on existing seat assemblies.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
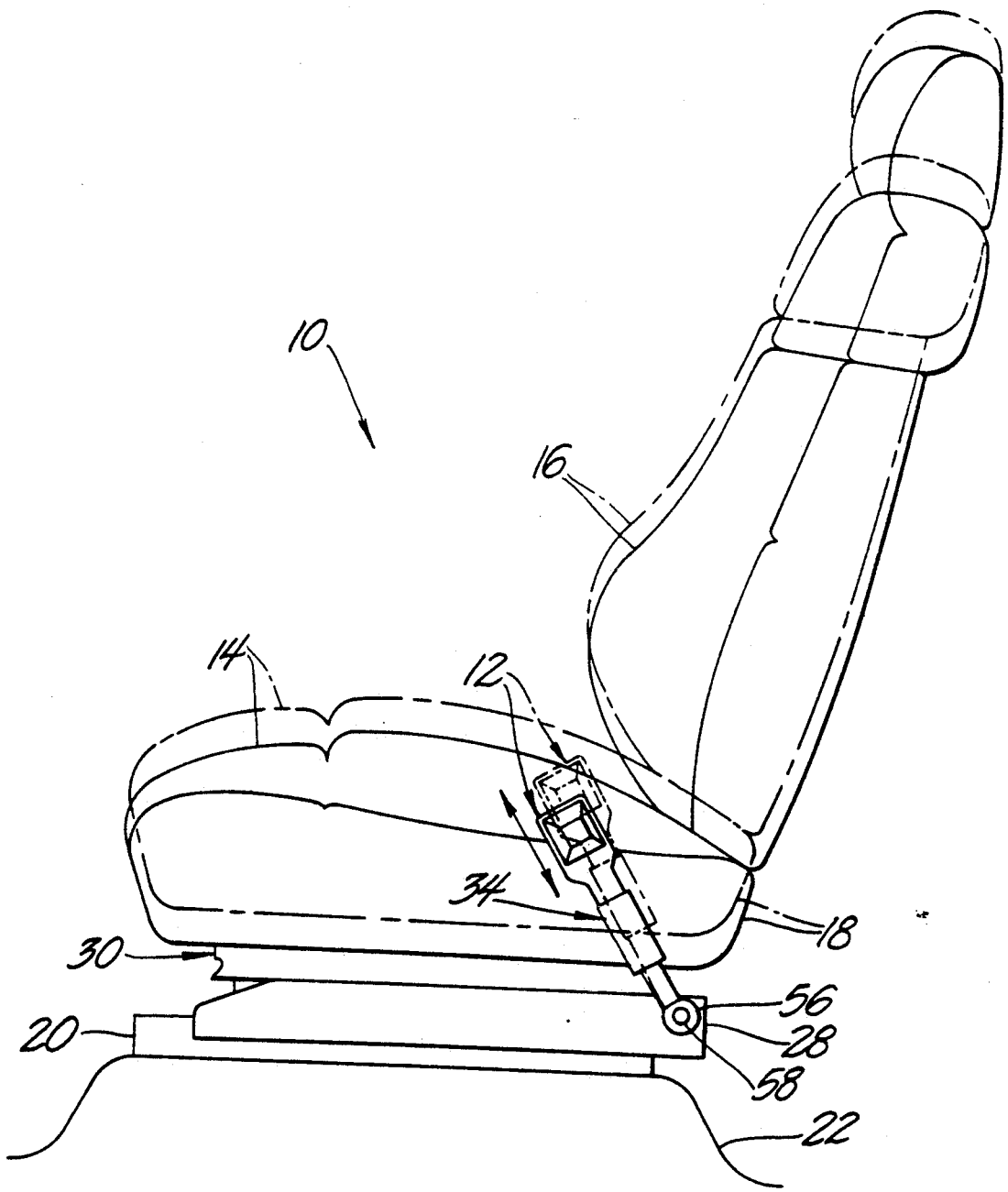
FIG. 1 is a simplified side view of an adjustable vehicular seat assembly according to the subject invention.
Figure 2:
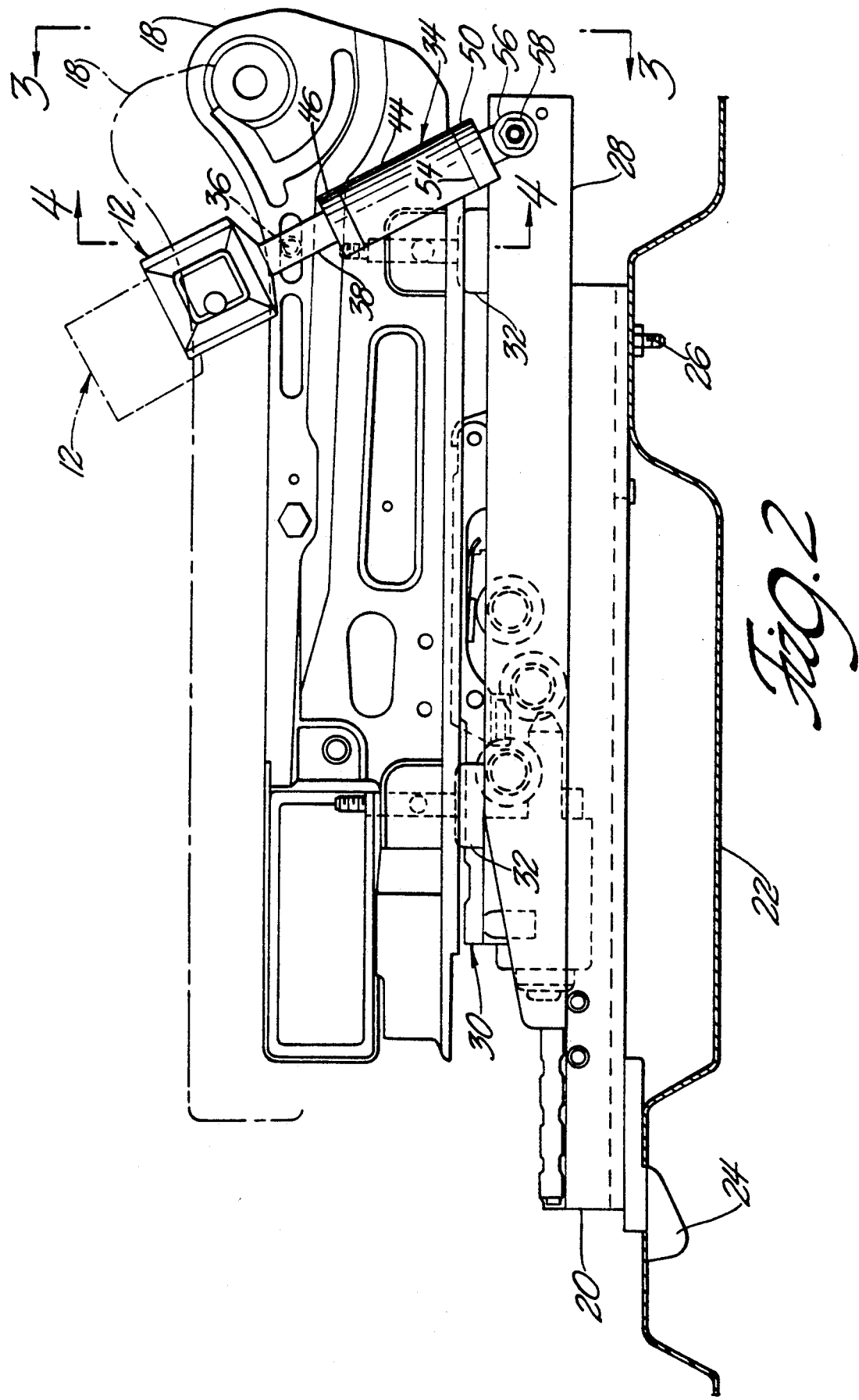
FIG. 2 is a side view of the subject assembly.

Referring to the Figures, wherein like numerals indicate like or corresponding parts throughout the several views, an adjustable vehicular seat assembly according to the subject invention is generally shown at 10 in FIG. 1. The seat assembly 10 includes partially integrated therewith certain components of an occupant restraint system, such as a buckle means, generally indicated at 12, for releasibly clasping a seat belt harness (not shown). The typical seat belt harness includes a lap belt and a shoulder belt supported on the vehicle body at various anchor points. The lap and shoulder belts merge together at a metal clasp-like member which releasibly engages with the buckle means 12. The buckle means 12 is shown in FIGS. 1 and 2 including the usual manual thumb release for disjoining the lap and shoulder belts from the buckle means 12.

The seat assembly 10 illustrated in FIG. 1 is a bucket style seat structured to accommodate a single occupant. However, the subject invention is equally adaptable to a bench style seat. In FIG. 1, the seat assembly 10 is shown including a seat cushion 14 and a backrest cushion 16. The cushions 14, 16 are structurally supported within a seat frame 18 typically fabricated from a rigid metallic material.

Figure 3:
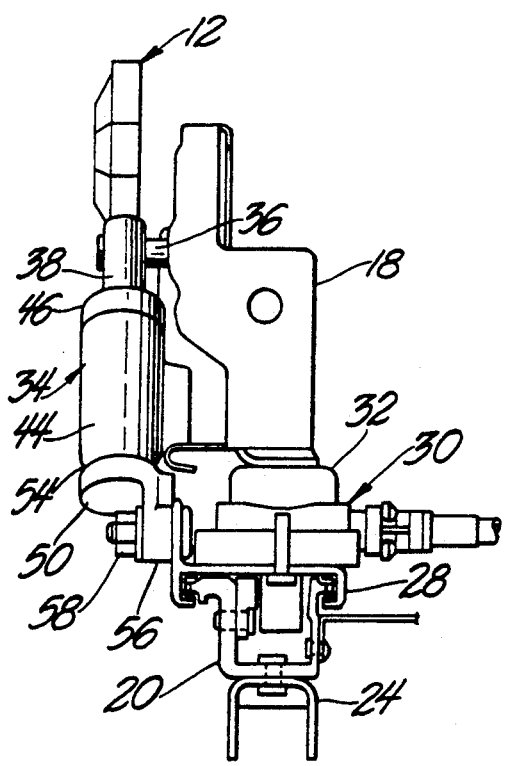
FIG. 3 is a rear end view as taken along lines 3—3 of FIG. 2.

The seat assembly 10 is adjustable forwardly and rearwardly to accommodate the physical characteristics, e.g., leg length, of the occupant. The seat assembly 10 includes a fixed rail 20 attached to the floor or underbody 22 of a vehicle. The rail 20 is anchored to the underbody 22 by a hook-shaped appendage 24 extending beneath its forwardmost end for engaging within a cross bar in the underbody 22. Bolts or some other fastening means attach the rearwardmost end of the fixed rail 20 to the underbody 22. As best shown in FIG. 3, the fixed rail 20 has a generally U-shaped cross section with a pair of outwardly extending flanges at the upper ends thereof.

A sliding rail 28 is movably carried on the fixed rail 20 in such a manner so as to provide smooth gliding horizontal movement between the fixed rail 20 and the sliding rail 28. The sliding rail 28 has a generally C-shaped cross section, as shown in FIG. 3, which matingly engages the flanges of the fixed rail 20. Preferably, a polymeric interface material is located between the sliding rail 28 and the fixed rail 20 to reduce sliding friction.

An articulator means, generally indicated at 30 in FIGS. 2 and 3, interconnects the seat frame 18 and the sliding rail 28 for moving the seat frame 18 upwardly and angularly relative to the sliding rail 28. The articular means 30 preforms the usual function of a six-Way power seat adjustment mechanism as disclosed in U.S. Pat. Nos. 4,993,747 and 5,037,132, both assigned to the assignee of the subject invention and the disclosures of which are hereby incorporated by reference. The articulator means 30 includes a pair of jack screw assemblies 32 which vertically actuate the respective forward and rearward ends of the seat frame 18 relative to the sliding rail 28. The jack screw assemblies 32 also carry the seat frame 18 with the sliding rail 28 during horizontal adjustment movement, i.e., when the seat frame 18 is adjusted fore and aft according to the occupant's physical characteristics. Therefore, the seat assembly 10 of the subject invention includes the fixed rail 20 and the sliding rail 18 which operate in the conventional manner with the seat frame 18 via the articulator means 30 to provide six-way power seat adjustment.

An adjustor means, generally indicated at 34 in FIGS. 1-5, is supported on and moveable with the sliding rail 28 for operatively connecting the buckle means 12 to the sliding rail 28 and for adjusting the distance between the buckle means 12 and the sliding rail 28 during articulated movement of the seat frame 18 to continuously maintain the buckle means 12 at a predetermined position relative to the seat frame 18 thereby increasing occupant comfort and convenience. In other words, the adjustor means 34 is anchored to the sliding rail 28 so that the buckle means 12 moves in unison as the seat frame 18 and sliding rail 28 are moved horizontally relative to the fixed rail 20. However, when the seat frame 18 is articulated in the vertical, or lateral, direction relative to the sliding rail 28 by the jack screw assemblies 32, the adjustor means 34 functions to maintain the buckle means 12 at a predetermined optimum position relative to the seat frame 18 so that the thumb actuator portion of the buckle means 12 always remains in an accessible location. That is, due to the compensating action of the adjustor means 34, the occupant is not required to grope and search for the buckle means 12 tucked under or behind the seat cushion 12 nor is the buckle means 12 and seat belt harness positioned uncomfortably above the seat cushion 14. Instead, the buckle means 12 and entire seat belt harness are always optimally positioned around the occupant regardless of seat adjustment position.

This continuous optimal positioning of the buckle means 12 by the adjustor means 34 provides an additional advantage not fully enjoyed by the prior art. Because the buckle means 12 is maintained in an optimum position, a predictable tensile force vector, or load path, is created by the seat belt harness. Therefore, the load bearing components of the seat assembly 10 can be accurately engineered to withstand tensile forces from a nearly constant tensile force vector.

Figure 4:
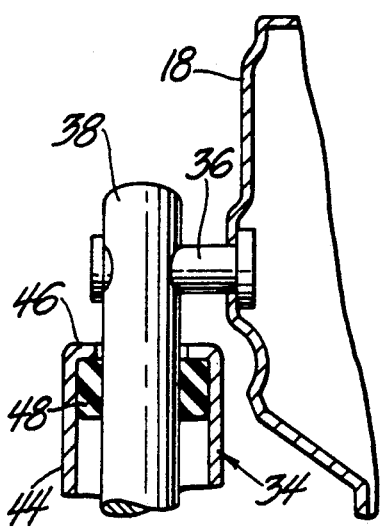
FIG. 4 is a fragmentary cross-sectional view as taken along lines 4—4 of FIG. 2.

The adjustor means 34 includes a pivot pin 36, best shown in FIGS. 3 and 4, extending from the buckle means 12 and pivotally connected to the seat frame 18 so as to establish and maintain the predetermined optimum position of the buckle means 12 relative to the seat frame 18. The adjustor means 34 pivotally connects to the sliding rail 28 at a nut and bolt arrangement 58. Thus, the adjustor means 34 extends between two pivotal connections 36, 58, one on the seat frame 18 and the other on the sliding rail 28. When the articulator means 30 adjusts the seat frame 18 laterally relative to the sliding rail 28, the adjustor means 34 automatically compensates for the changing spacial relationship between the two pivotal connections 36, 58.

Figure 5:
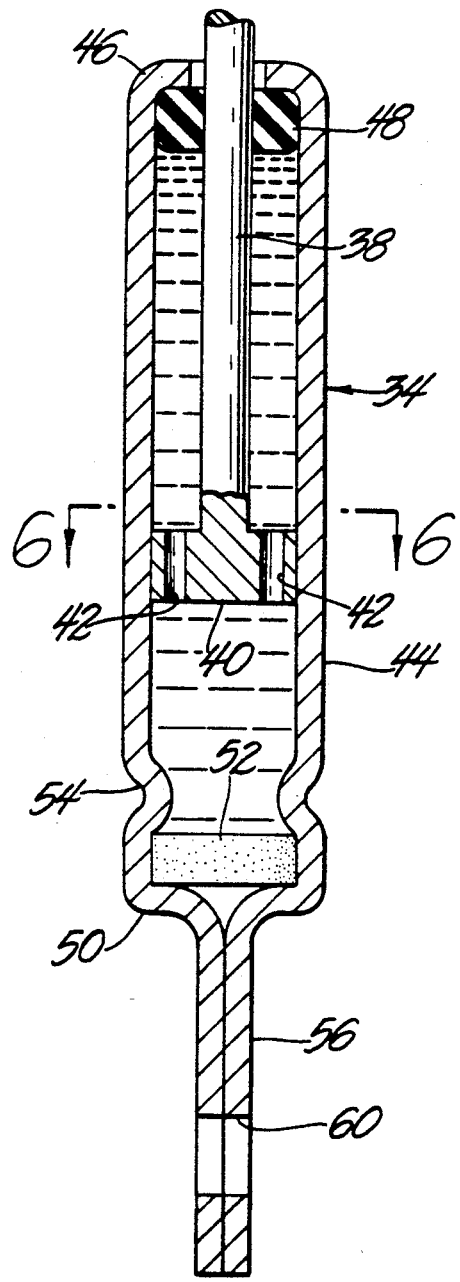
FIG. 5 is a cross-sectional view of the adjustor means of the subject invention.
Figure 6:
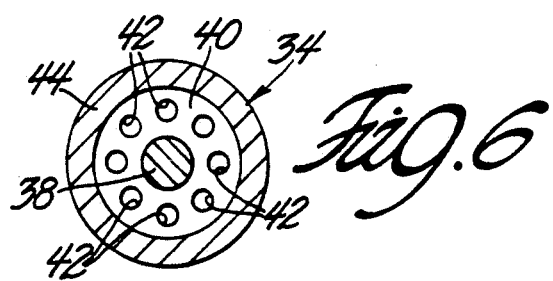
FIG. 6 is a cross-sectional view as taken along lines 6—6 of FIG. 5.

To accomplish this, the adjustor means 34 includes a piston rod 38 extending integrally from the buckle means 12 and supporting the pivot pin 36. A piston head 40 is shown in FIGS. 5 and 6 disposed on the distal end of the piston rod 38. The piston head 40 is a disc-shaped member having a plurality, e.g., eight, axially extending fluid flow controlling orifices 42. A fluid cylinder 44 operatively surrounds the piston head 40 and movably seals the piston rod 38 to create a hydraulic chamber filled with any of the typical hydraulic fluids. Particular rheological requirements will dictate one hydraulic fluid over another. The cylinder 44 is fabricated from a tubular member having an upper end 46 rolled inwardly to capture a seal 48 which surrounds and wipes the piston rod 38. The cylinder 44 also includes a lower end 50 rolled inwardly to support a seal 52. An annular crimp 54 firmly holds the seal 52 in place.

A mounting bracket 56 extends from the lower end 50 of the cylinder 54 and pivotally connects to the sliding rail 28 by the mentioned nut and bolt arrangement 58 secured through a hole 60 in the bracket 56.

In the event the occupant restraint system is placed under tension, a tensile loading will be applied to the buckle means 12. The tensile load is transferred through the piston rod 38 to the piston head 40. The rheological characteristics of the hydraulic fluid within the cylinder 44 flowing through the orifices 42 substantially retard or restrict rapid movement of the piston head 40 within the cylinder 44 so that the piston head 40 is essentially locked in the cylinder 44. Thus, the tensile load is transferred from the piston head 40 through the hydraulic fluid to the cylinder 44 anchored to the sliding rail 28 by the bracket 56. In other Words, Whenever the occupant restraint system is placed under load, the tensile forces are transferred directly through the buckle means 12 to the sliding rail 28. The pivot pin 36 does not act as a structural member resisting the tensile loads other than in an insignificant manner.

The relationship between the piston head 40, the size of its fluid passages 42 and the Viscosity of the hydraulic fluid in the cylinder 44, however, permit slow to moderate free movement of the piston head 40 within the cylinder 44 such that the seat frame 18 can be freely articulated relative to the sliding rail 28 without significant resistance by the adjustor means 34. And, as mentioned above, the adjustor means 34 is completely stationary while the sliding rail 28 is moved relative to the fixed rail 20. Therefore, the seat frame 28 can be moved rapidly fore and aft without moving the piston head 40 within the cylinder 44. However, because the articulator means 30 operates at a very slow and controlled rate, there are never demands for rapid movement placed upon the adjustor means 34 during seat position adjustment.

The subject invention overcomes the disadvantages of the prior art by supporting the adjustor means 34 upon the sliding rail 28 via the nut and bolt connection 58 through the bracket 56. In this manner, the adjustor means 34 remains stationary while the seat frame 18 and sliding rail 28 are moved fore and aft, while simultaneously maintaining the buckle means 12 in an optimum position relative to the seat frame 18 so as to maximize occupant comfort and convenience. Additionally, the adjustor means 34 is structured so that when the occupant restraint system is placed under tensile loading, the accompanying forces are transmitted through the buckle means 12 to the sliding rail 28. Further, the adjustor means 34 of the subject invention is arranged relative to the sliding rail 28 and the seat frame 18 so that demands for rapid adjustment are never placed upon the assembly except when the occupant restraint system is placed under load. Therefore, as distinguished from the prior art, the adjustor means 34 may be fabricated from a simple piston and cylinder arrangement which does not require electrifiable hydraulic fluid nor complicated over-travel mechanisms to account for rapid movements when the seat frame is adjusted fore and aft. Also, the adjustor means 34 of the subject invention can be made very compactly so as not to present obstruction to rear seat passengers or cargo. The adjustor means 34 is easily retrofit on existing seat structures.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. An adjustable vehicular seat assembly having integral occupant restraint components, said assembly comprising: a fixed rail for attachment to a vehicle underbody; a sliding rail movably carried on said fixed rail; a seat frame operatively supported above said sliding rail for receiving and supporting a vehicular seat cushion; articulator means interconnecting said seat frame and said sliding rail for moving said seat frame upwardly and angularly relative to said sliding rail; buckle means for clasping a seat belt harness; a piston rod extending from said buckle means; a piston head disposed on said piston rod; a fluid cylinder operatively surrounding said piston head and movably sealing said piston rod; and a mounting bracket extending from said cylinder and pivotally connected to said sliding rail.

2. An adjustable vehicular seat assembly having integral occupant restraint components, said assembly comprising: a fixed rail for attachment to a vehicle underbody; a sliding rail movably carried on said fixed rail; a seat frame operatively supported above said sliding rail for receiving and supporting a vehicular seat cushion; articulator means interconnecting said seat frame and said sliding rail for moving said seat frame upwardly and angularly relative to said sliding rail; buckle means for clasping a seat belt harness; a piston rod extending from said buckle means; a piston head disposed on said piston rod; said piston head including a plurality of flow controlling orifices extending therethrough; a fluid cylinder operatively surrounding said piston head and movably sealing said piston rod; and a mounting bracket extending from said cylinder and pivotally connected to said sliding rail.

* * * * *